United States Patent

Kida

[11] Patent Number: 5,619,390
[45] Date of Patent: Apr. 8, 1997

[54] MAGNETIC DISK APPARATUS WITH OFFSET HEAD ASSEMBLIES

[75] Inventor: Shingo Kida, Iwaki, Japan

[73] Assignee: Fujitsu Limited, Japan

[21] Appl. No.: 494,780

[22] Filed: Jun. 26, 1995

[30] Foreign Application Priority Data

Sep. 28, 1994 [JP] Japan .................. 6-233404

[51] Int. Cl.$^6$ .................. G11B 5/48; G11B 21/16
[52] U.S. Cl. .................................................. 360/104
[58] Field of Search ......................... 360/104–106

[56] References Cited

U.S. PATENT DOCUMENTS

| | | | |
|---|---|---|---|
| 4,800,455 | 1/1989 | Takizawa | 360/104 |
| 4,897,745 | 1/1990 | Binder-Kriegelstein | 360/104 X |
| 4,937,693 | 6/1990 | Connolly et al. | 360/104 X |
| 4,943,875 | 7/1990 | Reidenbach et al. | 360/104 |
| 5,065,267 | 11/1991 | Yohda | 360/104 |
| 5,218,496 | 6/1993 | Kaczeus | 360/104 X |
| 5,343,345 | 8/1994 | Gilovich | 360/106 X |

FOREIGN PATENT DOCUMENTS

| | | |
|---|---|---|
| 59-119581 | 7/1984 | Japan . |
| 59-218666 | 12/1984 | Japan . |
| 63-206980 | 8/1988 | Japan . |
| 1189083 | 7/1989 | Japan . |
| 346172 | 2/1991 | Japan . |
| 3171481 | 7/1991 | Japan . |
| 3176877 | 7/1991 | Japan . |
| 5151732 | 6/1993 | Japan . |

*Primary Examiner*—John H. Wolff
*Attorney, Agent, or Firm*—Greer, Burns & Crain, Ltd.

[57] ABSTRACT

A magnetic disk apparatus includes one kind of magnetic head, and head elements arranged only at a position adjacent to one of two rails. Two head assemblies with magnetic heads and flexible arms are attached to one access arm, and the flexible arms are arranged at offset positions from each other so that the position of the gap of one magnetic head coincides with the position of the gap of the other magnetic head.

6 Claims, 6 Drawing Sheets

MAGNETIC DISK APPARATUS WITH OFFSET HEAD ASSEMBLIES

BACKGROUND OF THE INVENTION

1. Field of the Invention

The present invention relates to a magnetic disk apparatus in which two head assemblies are arranged at positions offset from each other. The present invention also relates to a head assembly adapted for use in a magnetic disk apparatus.

2. Description of the Related Art

A magnetic disk apparatus used as a memory in computers includes magnetic disks, access arms, and head assemblies arranged to face the magnetic disks. Each head assembly comprises a magnetic head and a flexible arm (called a flexure) attached to the access arm for supporting the magnetic head. A magnetic head accesses a desired magnetic disk to read data stored in the magnetic disk or to write data to the magnetic disk.

In the conventional magnetic disk apparatus, one access arm is arranged between two adjacent magnetic disks, and two flexible arms are attached to one access arm. Magnetic heads are supported at the free ends of the flexible arms, respectively. One magnetic head faces the upper magnetic disk, and the other magnetic head faces the lower magnetic disk, so that each magnetic head can read or write data to or from the respective magnetic disk.

Such a conventional magnetic disk apparatus, as described above, has two sets of magnetic heads and flexible arms arranged at positions laterally offset from each other. In addition, other magnetic disk apparatus similar to those described above have the lengths of the flexible arms different from each other and change the securing points on the access arm for the flexible arms.

Each magnetic head (or a core slider) has rails for receiving an airflow generated by the rotation of the magnetic disks so that the magnetic head flies above the magnetic disk. The magnetic head also includes a magnetic element with a coil, a pole and a gap for reading or writing magnetic data. Typically, the magnetic head has two parallel rails. In recent magnetic heads, the magnetic element with the coil, the pole and the gap are built into the structure of the magnetic head using a semiconductor fabrication technique.

The magnetic head usually includes two magnetic elements therein such that each magnetic element is arranged adjacent to one of the rails. Two flexible arms supporting respective magnetic heads are attached to the access arm in such a manner that two flexible arms are arranged in an exactly overlapped relationship. In some cases, two flexible arms are arranged at laterally offset positions from each other, as described above. However, in many cases, it is desirable that two flexible arms are attached to the access arm in an exactly overlapped relationship so that the upper and lower magnetic heads on either side of the access arm can access the identical tracks of the respectively facing magnetic disks.

Although the magnetic head includes two magnetic element, only one magnetic element is actually used. Therefore, if a magnetic head having only one magnetic element formed therein can be used, it is possible to reduce the cost of manufacturing the magnetic head. Besides, requests for a core slider having a smaller size are increasing, and it is becoming difficult to manufacture a smaller core slider having two magnetic elements formed therein. In particular, if a core slider is smaller than 1.8×1.0×0.3 (millimeter), it is difficult to form terminals having low resistances. Therefore, it is desired that a magnetic head having only one magnetic element formed therein be used.

However, when the flexible arms are attached to the access arm, two magnetic heads are arranged in positions rotated by 180 degrees to each other. That is, the upper magnetic head is arranged to face the upper magnetic disk, and the lower magnetic head is arranged to face the lower magnetic disk. Now supposing that a magnetic head, which has only one magnetic element formed therein and in which the magnetic element is arranged adjacent to one of the rails (referred here the right rail here for clarity), is used, and that two sets of magnetic head assemblies are viewed from the upper magnetic disk, the head element in the upper magnetic head is positioned at the right end of the upper magnetic head and the head element in the lower magnetic head is positioned at the left end of the lower magnetic head, so that the head elements of the upper and lower magnetic heads are displaced from each other and cannot access the identical tracks on the respective magnetic disks.

Therefore, if a magnetic head having only one magnetic element formed therein is to be used, it is necessary to prepare two kinds of magnetic heads, i.e., one magnetic head having the magnetic element arranged adjacent to the right rail and the other magnetic head having the magnetic element arranged adjacent to the left rail, and the two magnetic heads are arranged to face the upper and lower magnetic disks so that the position of the gap of the upper magnetic head coincides with the position of the gap of the lower magnetic head. While it is possible to use the magnetic heads in such a manner that the position of the gap of the upper magnetic head is displaced from the position of the gap of the lower magnetic head, it is difficult to decide the positions of the magnetic heads and it may be impossible to read magnetic data when one magnetic head is damaged and replaced by a new one, particularly if the density of the tracks of the magnetic disks increases, or if a variation in the products exists.

Therefore, two kinds of magnetic heads must be prepared if a magnetic head having only one magnetic element formed therein is to be used and the manufacturing cost cannot,be reduced. A further problem arises in that the management of two kinds of magnetic heads is difficult, and the management of the head assemblies including such magnetic heads is also difficult.

SUMMARY OF THE INVENTION

The object of the present invention is to provide a magnetic disk apparatus in which two magnetic heads having single magnetic elements can access the identical tracks on the magnetic disks which the two magnetic heads face.

Another object of the present invention is to provide a magnetic disk apparatus in which the management of magnetic assemblies, having single magnetic elements is simplified.

A further object of the present invention is to provide a head assembly which can be attached to an access arm in an offset positional relationship with another similar head assembly.

According to the present invention, there is provided a magnetic disk apparatus comprising magnetic disks, access arms, and head assemblies each including a magnetic head arranged to face the magnetic disk and a flexible arm attached to the access arm to support the magnetic head, each magnetic head having two parallel rails and a head element having a gap and formed at a position adjacent to one of two rails, and two head assemblies being attached to one access arm on either side thereof with the gaps of the head elements facing outwardly, two head assemblies being arranged at offset positions from each other so that the position of the gap of one head element coincides with the position of the gap of the other head element.

In this arrangement, the flexible arms are attached to the access arm at offset positions from each other so that the position of the gap of one head element coincides with the position of the gap of the other head element. Therefore, it is possible that two magnetic heads supported by the common access arm can access the identical tracks of the respective magnetic disks, by using one kind of magnetic heads having single head elements arranged adjacent to one of the rails.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 7:
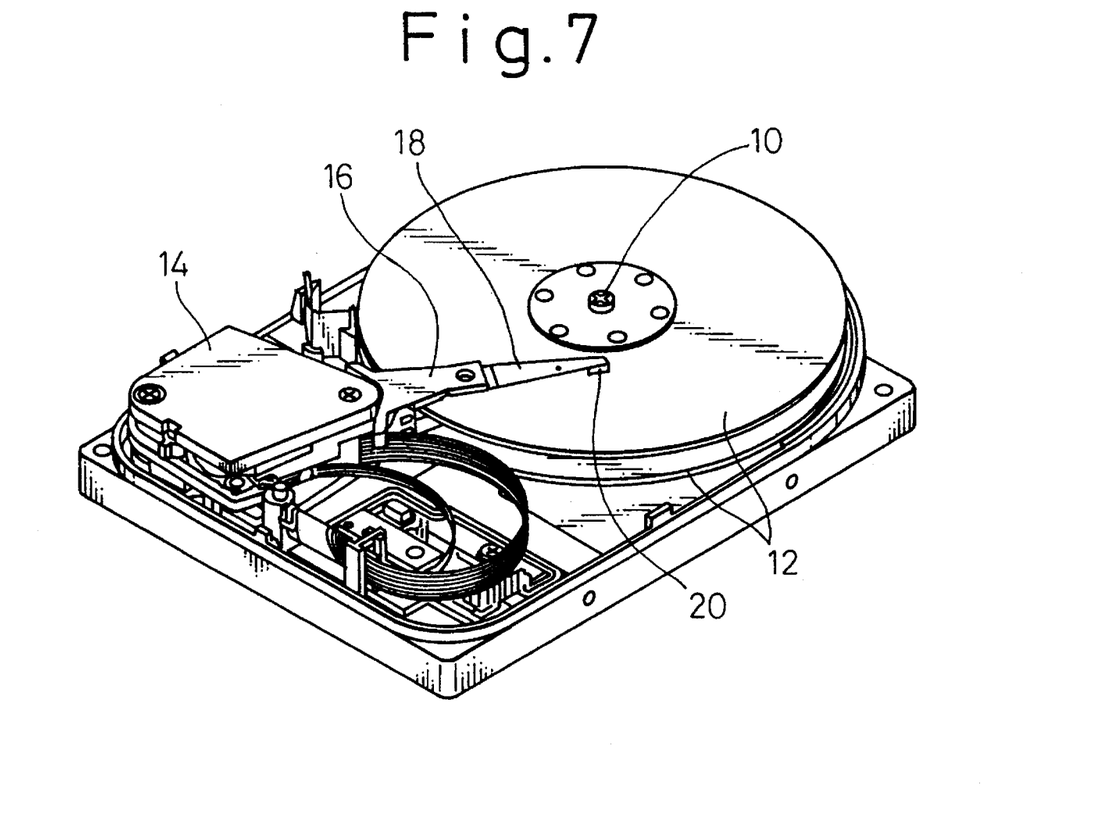
FIG. 7 is a perspective view illustrating the interior of the magnetic disk apparatus according to the present invention.
Figure 8:
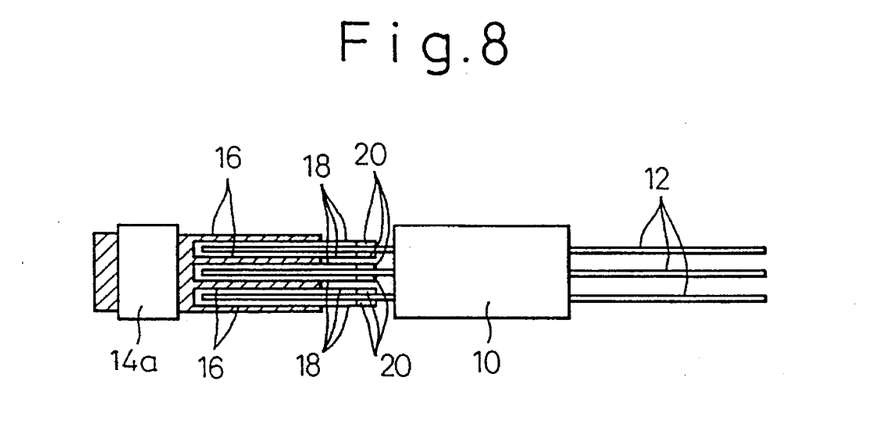
FIG. 8 is a cross-sectional view of the magnetic disk apparatus of FIG. 7;.

Referring and FIGS. 7 to 8, the magnetic disk apparatus includes magnetic disks 12 supported and driven by a spindle motor 10, access arms 16 attached to a rotatable shaft 14a of a voice coil motor 14 and driven by the latter, flexures or flexible arms 18 attached to the access arms 16, and magnetic heads 20 fixed to the flexible arms 18 by adhesive.

In FIG. 8, three magnetic disks 12 are shown and four access arms 16 are integrally supported by the rotatable shaft 14a of the voice coil motor 14. Each magnetic head 20 is fixed, at a surface, to the flexible arms 18, this surface being on the opposite side from a surface having rails as described later. The magnetic head 20 and flexible arm 18 constitute a head assembly. The flexible arm 18 in each head assembly is attached to the access arm 16 by permanent deformation fixation or by adhesive.

Each of the uppermost and lowermost access arms 16 supports one head assembly (the magnetic head 20 and the flexible arm 18), and each of the intermediate access arms 16 supports two head assemblies (the magnetic heads 20 and the flexible arms 18). In two head assemblies supported by each intermediate access arm 16, the magnetic head 20 of the upper head assembly faces the surface of the upper magnetic disk 12 located above this magnetic head 20, and the magnetic head 20 of the lower head assembly faces the surface of the lower magnetic disk 12 located below this magnetic head 20. The access arms 16 and the flexible arms 18 are arranged to move approximately in the radial direction of the magnetic disks 12.

Figure 1:
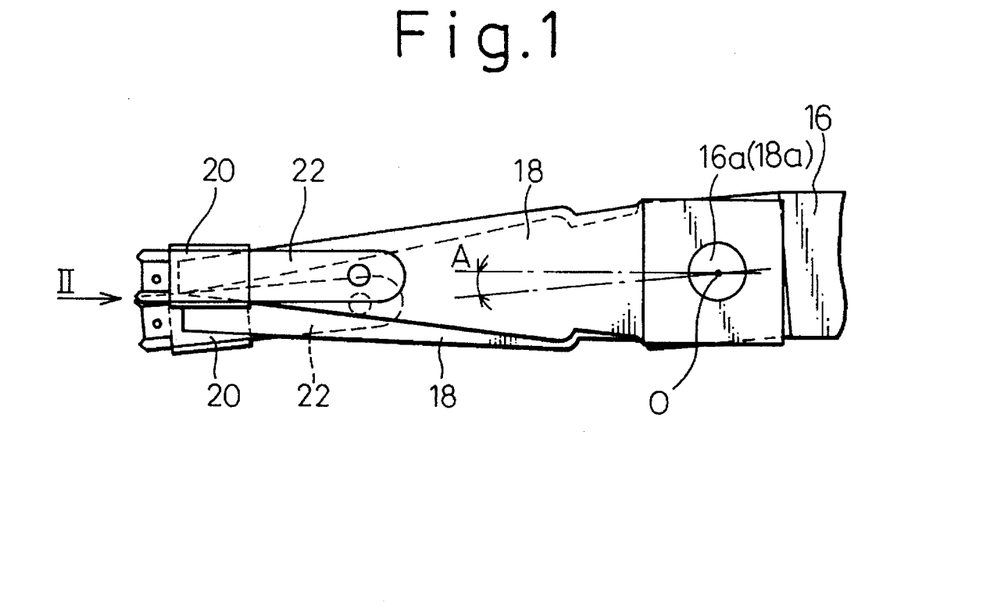
FIG. 1 is a plan view of two head assemblies, including magnetic heads and flexible arms attached to an access arm, according to the first embodiment of the present invention.
Figure 2:
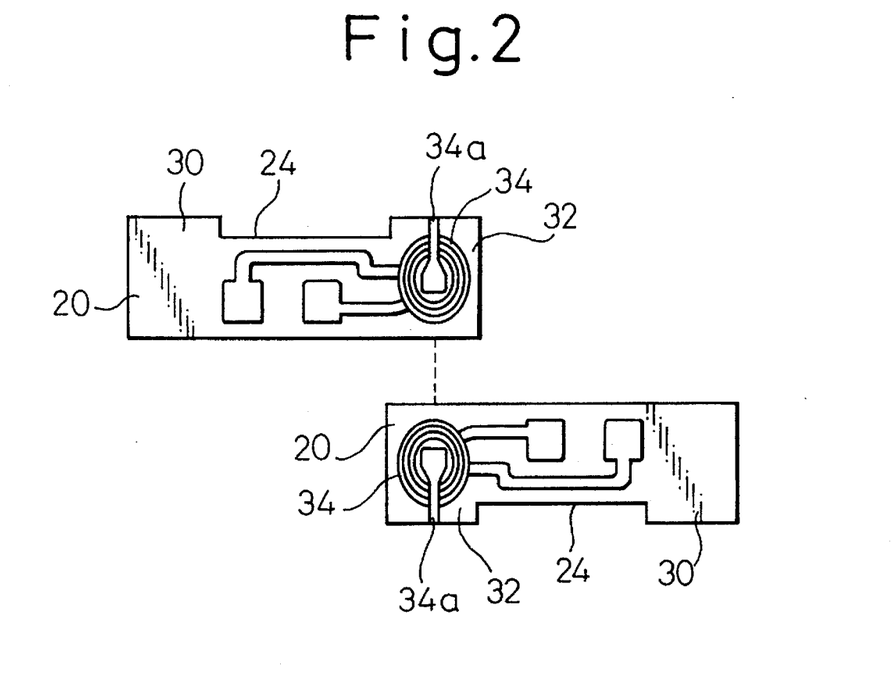
FIG. 2 is an enlarged end view of the magnetic heads, viewed in the direction of the arrow II in FIG. 1.
Figure 3:
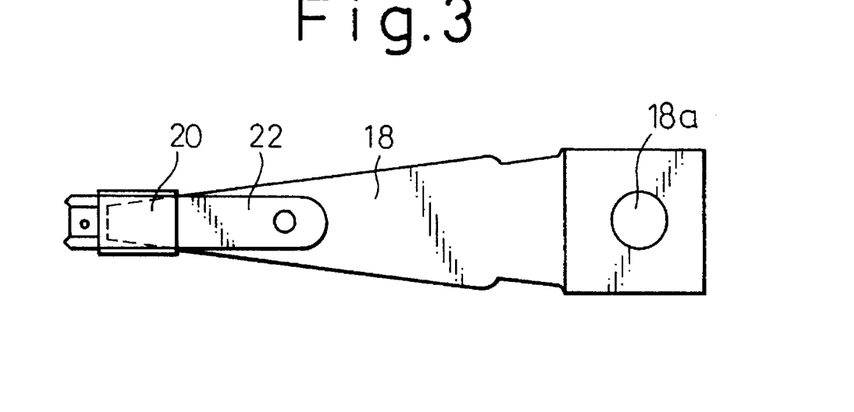
FIG. 3 is a plan view of the magnetic head and the flexible arm of FIG. 1.
Figure 4:
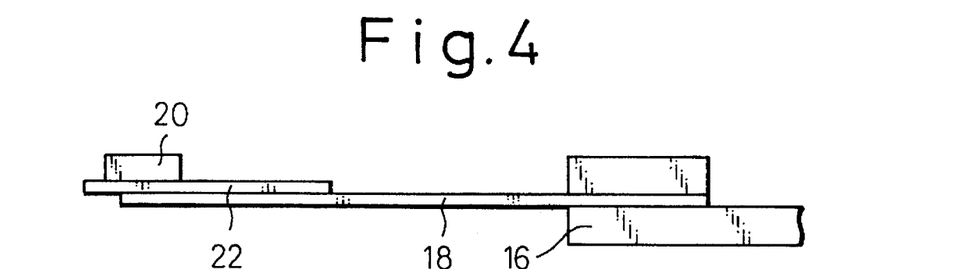
FIG. 4 is a side view of the magnetic head and the flexible arm of FIG. 3.
Figure 5:
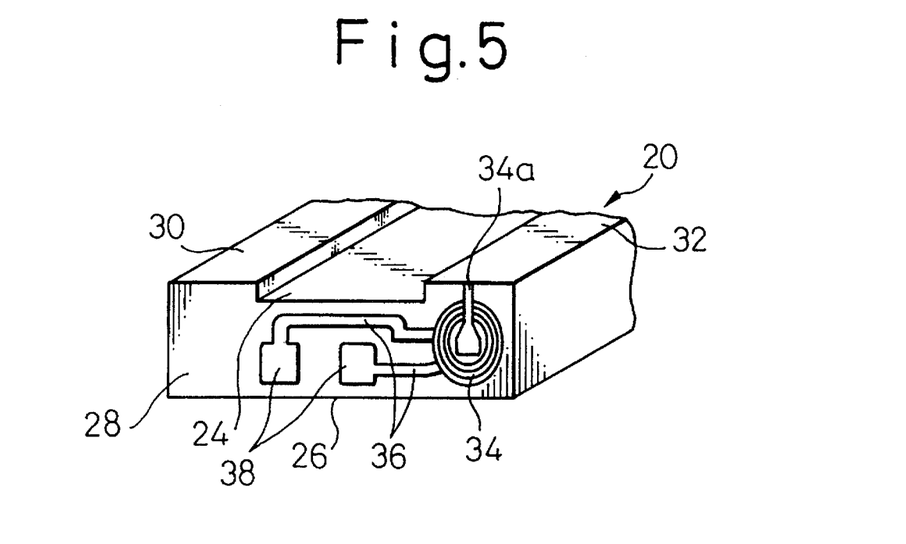
FIG. 5 is a perspective view of the magnetic head of FIG. 3.

FIG. 1 is a plan view of the magnetic heads 20 and flexible arms 18 of two head assemblies supported by one access arm 16. FIG. 2 is an enlarged end view of two magnetic heads 20, viewed in the direction of the arrow II in FIG. 1, with the flexible arms 18 deleted. FIGS. 3 to 5 show one set of the magnetic head 20 and the flexible arm 18.

In this embodiment, the magnetic head 20 is supported by the flexible arm 18 via a gimbal 22.

Figure 6:
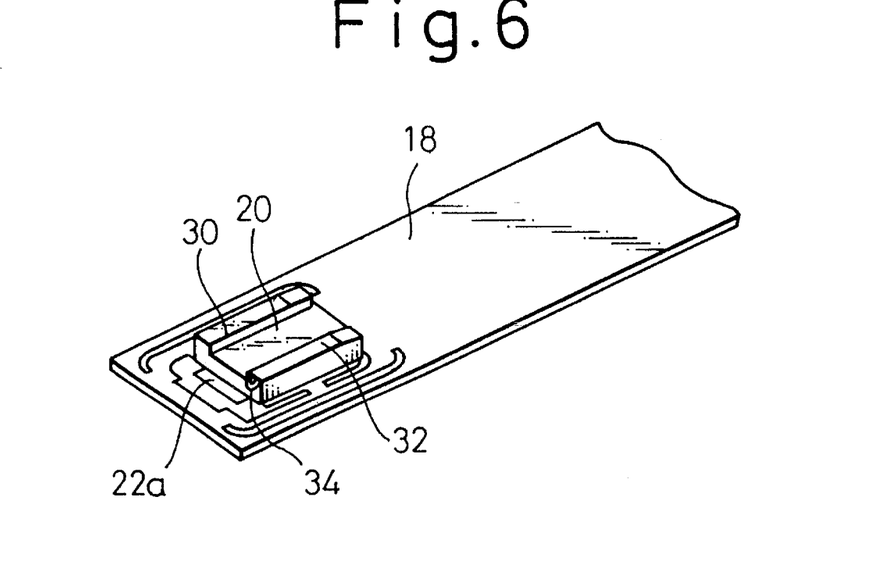
FIG. 6 is a perspective view of the magnetic head and the flexible arm according to the second embodiment of the present invention.

In the embodiment of FIG. 6, the flexible arm 18 itself has a gimbal 22a formed by grooves and lands, and the magnetic head 20 is fixed to the gimbal 22a. The head assembly of FIG. 6 is similar to the head assembly of FIGS. 3 to 5, and can be used for the arrangement of FIGS. 1 and 2.

In FIG. 5, the magnetic head 20 includes a body called a core slider, which has an upper surface 24, a lower surface 26 and a rear end surface 28. Two rails 30 and 32 are arranged on the upper surface 24 of the magnetic head 20 and extend parallel to each other in a predetermined direction to allow the magnetic head 20 to fly. The upper surface 24 having the rails 30 and 32 is arranged to face the surface of the magnetic disk 12.

A head element 34 is formed on the rear end surface 28 at a position adjacent to one of two rails 30 and 32 (right rail 32 in FIG. 5). No head element is formed near the other rail (left rail 30). The head element 34 includes a coil, a pole and a gap 34a for reading and writing magnetic data, the gap 34a being formed at the surface of the rail 32. The head element 34 can be built into the structure of the rear end surface 28 or in the material forming the body of the magnetic head 20, using a semiconductor fabrication technique. In addition, in the embodiment, leads 35 and gold pads (terminals) 38 are formed on the rear end surface 28 and connected to the head element 34. In this way, the present invention utilizes the magnetic head 20 having only one head element 34 formed at a position adjacent to one of two rails 30 and 32 (right rail 32).

In FIGS. 1 and 2, two magnetic heads 20 are supported by one access arm 16 through the respective flexible arms 18. The flexible arm 18 of one (upper) head assembly and the flexible arm 18 of the other (lower) head assembly are fixed to the access arm 16 at a common securing hole 16a by a permanent deformation fixation. During the fixing, the flexible arm 18 of one (upper) head assembly and the flexible arm 18 of the other (lower) head assembly are arranged with a certain offset angle A between them. To this end, the flexible arms 18 have holes 18a corresponding to the securing hole 16a of the access arm 16, and the permanent deformation fixation is carried out by bringing the holes 16a and 18a into alignment with each other and inserting a tool into the aligned holes 16a and 18a to cause the material around the holes 18a of the flexible arms 18 to be permanently deformed in the common securing hole 16a. The apex of the offset angle A is on the center 0 of the hole 16a and the offset angle A is decided depending on the size of the magnetic heads 20 and the size of the flexible arms 18. Alternatively, it is possible to fix the flexible arms 18 to the access arm 16 by adhesive, so that the flexible arm 18 of one (upper) head assembly and the flexible arm 18 of the other (lower) head assembly are arranged with a certain offset angle A.

The magnetic head 20 of one (upper) head assembly is supported by its flexible arm 18 so that the upper surface 24 having the rails 30 and 32 faces upwardly, i.e., outwardly, and the magnetic head 20 of the other (lower) head assembly is supported by its flexible arm 18 so that the upper surface 24 having the rails 30 and 32 faces downwardly, i.e., outwardly. Therefore, the positions of the upwardly facing magnetic head 20 and the downwardly facing magnetic head 20 are turned by 180 degrees from each other. The head element 34 of the upwardly facing magnetic head 20 is placed at the right end thereof and the head element 34 in the downwardly facing magnetic head 20 is placed at the left end thereof.

As shown in FIG. 2, the gap 34a of the upwardly facing magnetic head 20 and the gap 34a of the downwardly facing magnetic head 20 overlap in line one above the other, that is, the position of the gap 34a of the upwardly facing magnetic head 20 coincides with the position of the gap 34a of the downwardly facing magnetic head 20. Therefore, the upwardly facing magnetic head 20 and the downwardly facing magnetic head 20 can access the identical tracks of the facing magnetic disks 12 when the access arm 16 is in the same position. This is attained by arranging the flexible arms 18 with a certain offset angle A between the flexible arm 18 of one head assembly and the flexible arm 18 of the other head assembly. Therefore, it is possible that two magnetic heads 20 supported by the common access arm 16 can access the identical tracks of the respective magnetic disks 12, even if one kind of magnetic heads 12 having single head elements 34 are used. If a read-gap and a write-gap are arranged, it is possible that the read-gaps and write-gaps overlap, respectively.

Figure 9:
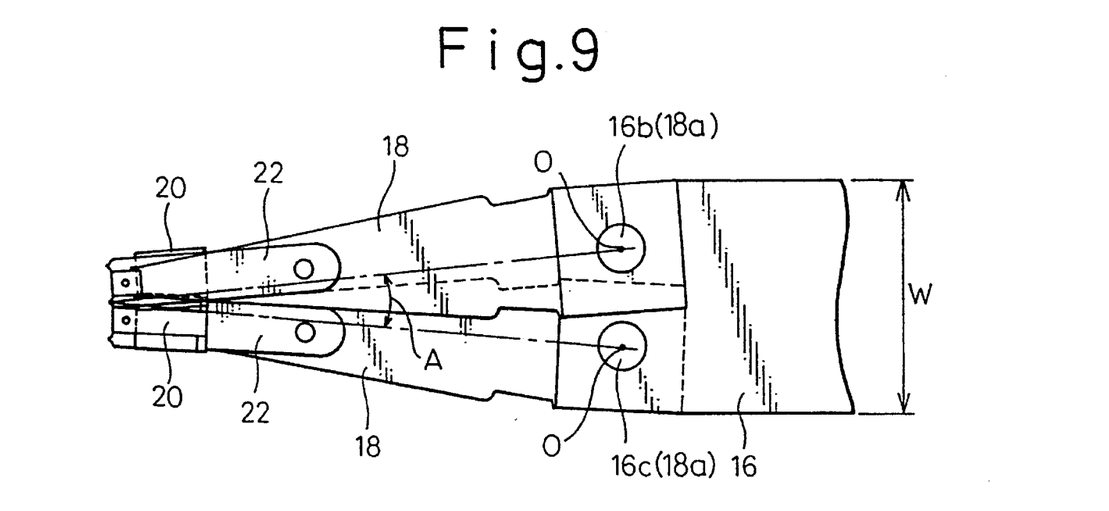
FIG. 9 is a plan view of the magnetic heads and the flexible arms according to the third embodiment of the present invention.

FIG. 9 shows another embodiment of the present invention. Two magnetic heads 20 are supported by an access arm 16 through flexible arms 18, respectively. The magnetic head 20 is similar to that of FIG. 5 and thus includes one head element 34 adjacent to one of the rails 30 and 32.

The flexible arms 18 have respective securing holes 18a, and the access arm 16 has separate securing holes 16b and 16c. The flexible arms 18 are fixed to the access arm 16 by the securing holes 18a, and the securing holes 16b and 16c arranged in alignment with each other, by a permanent deformation fixation or adhesive, whereby the flexible arms 18 of these head assemblies are offset from each other with a certain offset angle A so that the position of the gap 34a of the upwardly facing magnetic head 20 coincides with the position of the gap 34a of the downwardly facing magnetic head 20. That is, two magnetic heads 20 are arranged so that two gaps 34a overlap one above the other, in a manner as shown in FIG. 2. In this embodiment too, it is possible that two magnetic heads 20 supported by the common access arm 16 can access the identical tracks of the respective magnetic disks 12, by using one kind of magnetic heads 12 having single head elements 34 arranged adjacent to one of the rails 30 and 32. The apex of the offset angle A is on the gaps of the magnetic heads 20 and offset angle A is decided depending on the distance from the gaps of the magnetic heads 20 to the centers 0 of the attachment of the flexible arms 18 to the access arm 16 and the width W of the access arm 16.

Figure 10:
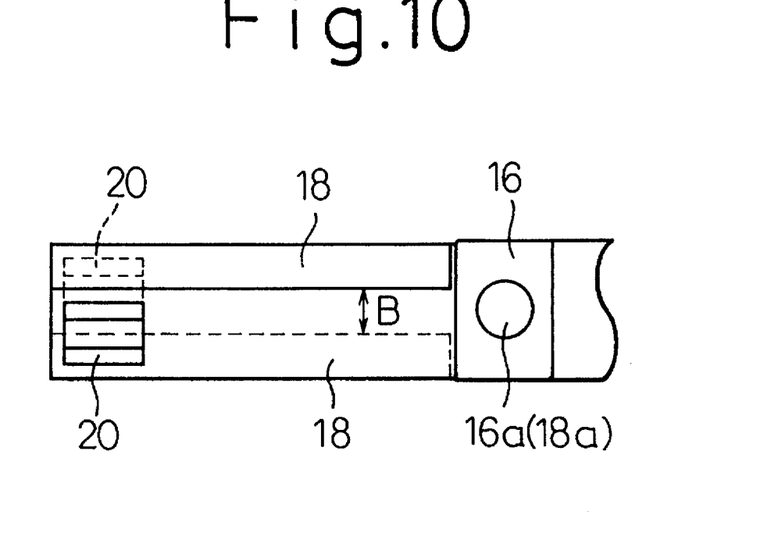
FIG. 10 is a plan view of the magnetic heads and the flexible arms according to the fourth embodiment of the present invention.
Figure 11:
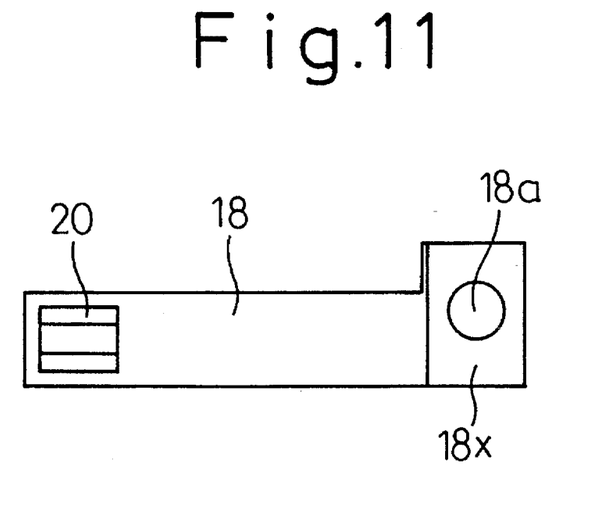
FIG. 11 is a plan view of one of the head assemblies of FIG. 10.

FIGS. 10 and 11 show the fourth embodiment of the present invention. Two magnetic heads 20 are supported by an access arm 16 through flexible arms 18. A gimbal is deleted in this example, but it will be apparent that the gimbal 22 of FIG. 3 or the gimbal 22a of FIG. 6 can be used in this example. The magnetic head 20 is similar to that of FIG. 5 which includes one head element 34 adjacent to one of the rails 30 and 32.

In this embodiment, the flexible arm 18 has a mounting portion 18x for mounting the flexible arm 18 to the access arm 16, a part of the mounting portion 18x laterally projecting from one side of the body portion of the flexible arm 18, as shown in FIG. 11. A securing hole 18a is arranged at the center of the mounting portion 18x. The flexible arm 18 of one head assembly and the flexible arm 18 of the other head assembly are fixed to the access arm 16 with the securing holes 18a and 16a in alignment with each other, whereby the flexible arms 18 of these head assemblies are parallel but offset from each other with a certain offset distance B. In this case too, the position of the gap 34a of one magnetic head 20 coincides with the position of the gap 34a of the other magnetic head 20, as shown in FIG. 2. The offset distance B is decided depending on the size of the core sliders and the size of the flexible arms 18.

Figure 12:
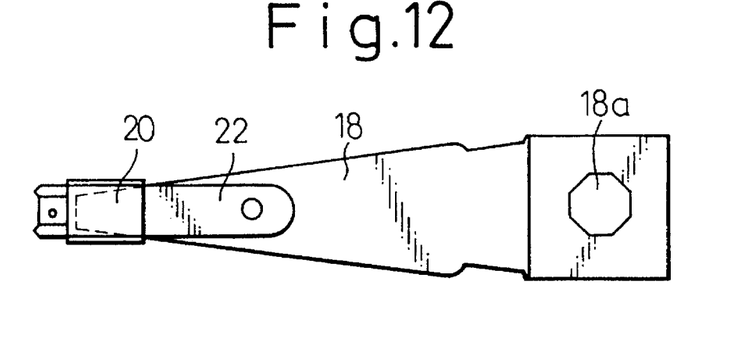
FIG. 12 is a plan view of the head assembly according to the fifth embodiment of the present invention.

FIG. 12 shows the fifth embodiment of the present invention. In this embodiment, a head assembly includes a magnetic head 20, and a flexible arm 18 which can be attached to an access arm 16 (not shown in FIG. 12) for supporting the magnetic head 20. A gimbal 22 is arranged between the magnetic head 20 and the flexible arm 18. The flexible arm 18 has a non-circular hole 18a for attaching the head assembly to the access arm 16. In the embodiment, the non-circular hole 18a is shaped in a regular octagonal shape. It is possible to attach the head assembly with the magnetic head 20 and the flexible arm 18 to the access arm 16 of the magnetic disk apparatus, by using the non-circular hole 18a as positioning means and fixing means.

Figure 13:
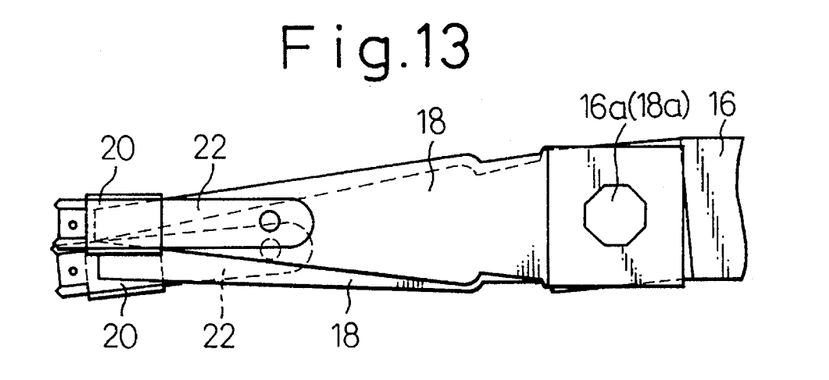
FIG. 13 is a plan view of one example of the head assemblies using the head assembly of FIG. 12.

FIG. 13 shows an example that the head assemblies, shown in FIG. 12, to the access arm 16 of the magnetic disk apparatus. In this example, the flexible arms 18 have regular octagonal holes 18a, and the access arm 16 also has a corresponding regular octagonal hole 16a. The regular octagonal hole 16a of the access arm 16 is arranged, for example, so that a pair of facing sides of the octagon extend parallel to the longitudinal axis of the access arm 16. On the other hand, the securing holes 18a of the flexible arms 18 are arranged, for example, so that a pair of facing sides of the octagon extend at a half of the offset angle A (see FIG. 1) relative to the longitudinal axes of the flexible arms 18. Therefore, when the flexible arms 18 are fixed to the access arm 16 with the securing holes 16a and 18a in alignment with each other, the flexible arms 18 of these head assemblies are automatically offset from each other with a certain offset angle A. The present invention is not limited to the regular octagonal holes 18a and 16a, but it is possible to use any shapes for the non-circular holes 18a and 16a.

Figure 14:
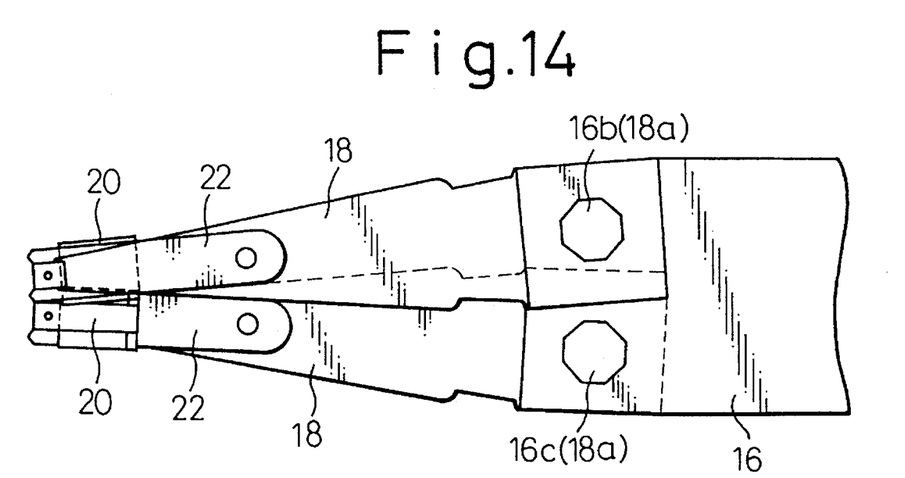
FIG. 14 is a plan view of another example of the head assemblies using the head assembly of FIG. 12.

FIG. 14 shows another example that the head assemblies, shown in FIG. 12, to the access arm 16 of the magnetic disk apparatus. In this example, the flexible arms 18 have regular octagonal holes 18a, and the access arm 16 has corresponding regular octagonal holes 16b and 16c. The regular octagonal holes 16b and 16c of the access arm 16 are arranged, for example, so that a pair of facing sides of the octagon extend at a half of the offset angle A (see FIG. 1) relative to the longitudinal axis of the access arm 16. On the other hand, the securing holes 18a of the flexible arms 18 are arranged, for example, so that a pair of facing sides of the octagon extend parallel to the longitudinal axes of the flexible arms 18. Therefore, when the flexible arms 18 are fixed to the access arm 16 with the securing holes 16b and 18c, and 18a in alignment with each other, the flexible arms 18 of these head assemblies are automatically offset from each other with a certain offset angle A. In this case too, the present invention is not limited to the regular octagonal holes 18a and 16a, but it is possible to use any shapes for the noncircular holes 18a and 16a.

As explained in detail, according to the present invention, it is possible that two magnetic heads supported by the common access arm can access the identical tracks of the respective magnetic disks, without a need for a complicated control means, by using one kind of magnetic heads having single head elements 34 arranged adjacent to one of the rails. Accordingly, it is possible to reduce a manufacturing cost of the magnetic heads. It is also possible to simplify the manufacturing process because one kind of magnetic head is manufactured and used.

I claim:

1. A magnetic disk apparatus comprising:

magnetic disks;

planar access arms;

head assemblies, each head assembly including a magnetic head arranged to face a magnetic disk and a flexible arm attached to a planar access arm for supporting the magnetic head;

each magnetic head having two parallel rails and a head element having a gap, the head element being formed at a position adjacent to one of the two parallel rails; and two of the head assemblies being attached to one planar access arm on either side thereof with the gaps of the head elements facing outwardly, the two head assemblies being arranged at offset positions from each other so that a position of the gap of one head element coincides and is aligned with a position of the gap of the other head element.

2. A magnetic disk apparatus according to claim 1, wherein at said one planar access arm has at least one securing hole extending therethrough, and the two head assemblies are attached to said one planar access arm at said at least one securing hole.

3. A magnetic disk apparatus according to claim 1, wherein said one planar access arm has two securing holes, and the two head assemblies are respectively attached to said one planar access arm at said two securing holes.

4. A magnetic disk apparatus according to claim 1, wherein said one planar access arm has at least one securing hole and the two head assemblies have securing holes for engagement with the at least one securing hole, the securing holes of the two head assemblies having a shape corresponding to a shape of the at least one securing hole of said one planar access arm with an offset between the two head assemblies.

5. A magnetic disk apparatus according to claim 1, wherein the two head assemblies attached to said one planar access arm on either side thereof are arranged with a predetermined offset angle therebetween.

6. A magnetic disk apparatus according to claim 1, wherein the two head assemblies attached to said one planar access arm on either side thereof are arranged with a predetermined offset distance therebetween.

* * * * *

UNITED STATES PATENT AND TRADEMARK OFFICE
CERTIFICATE OF CORRECTION

PATENT NO. : 5,619,390
DATED : April 8, 1997
INVENTOR(S) : Kida

It is certified that error appears in the above-indentified patent and that said Letters Patent is hereby corrected as shown below:

Column 1, line 61, delete "ment, only" and insert --ments, only-- therefor.

Column 2, line 13, delete "referred here the" and insert --referred to as the-- therefor.

Column 2, line 43, delete "cannot, be" and insert --cannot be-- therefor.

Column 3, line 63, delete "and FIGs. 7 to 8" and insert --to FIGs. 7 and 8--.

UNITED STATES PATENT AND TRADEMARK OFFICE
CERTIFICATE OF CORRECTION

PATENT NO. : 5,619,390
DATED : April 8, 1997
INVENTOR(S) : Kida

It is certified that error appears in the above-indentified patent and that said Letters Patent is hereby corrected as shown below:

Column 6, line 49, delete "example that the" and insert --example of the-- therefor.

Column 6, line 50, after "Fig. 12,", insert --attached--.

Column 7, line 1, delete "example that the" and insert --example of the-- therefor.

Column 7, line 2, after "Fig. 12,", insert --attached--.

Column 7, line 14, delete "16b and 18c," and insert --16b and 16c,-- therefor.

UNITED STATES PATENT AND TRADEMARK OFFICE
CERTIFICATE OF CORRECTION

PATENT NO.   : 5,619,390
DATED        : April 8, 1997
INVENTOR(S)  : Kida

It is certified that error appears in the above-indentified patent and that said Letters Patent is hereby corrected as shown below:

Column 7, line 18, delete "18a and 16a," and insert --18a, 16b and 16c,-- therefor.

Column 7, lines 19-20, delete "18a and 16a."

and insert -- 18a, 16b and 16c.-- therefor.

Column 8, line 14, delete "wherein at said one" and insert --wherein said one-- therefor.

Signed and Sealed this

Sixteenth Day of June, 1998

Attest:

BRUCE LEHMAN

Attesting Officer

Commissioner of Patents and Trademarks